United States Patent
Nakagawa

(10) Patent No.: US 10,152,158 B2
(45) Date of Patent: Dec. 11, 2018

(54) INFORMATION PROCESSING APPARATUS AND CONTROL METHOD OF INFORMATION PROCESSING APPARATUS

(71) Applicant: CLARION CO., LTD., Saitama (JP)

(72) Inventor: Yuichiro Nakagawa, Saitama (JP)

(73) Assignee: CLARION CO., LTD., Saitama-Shi, Saitama (JP)

( * ) Notice: Subject to any disclaimer, the term of this patent is extended or adjusted under 35 U.S.C. 154(b) by 0 days.

(21) Appl. No.: 15/523,554

(22) PCT Filed: Oct. 21, 2015

(86) PCT No.: PCT/JP2015/079701
§ 371 (c)(1),
(2) Date: May 1, 2017

(87) PCT Pub. No.: WO2016/098443
PCT Pub. Date: Jun. 23, 2016

(65) Prior Publication Data
US 2017/0308214 A1    Oct. 26, 2017

(30) Foreign Application Priority Data
Dec. 15, 2014  (JP) .................. 2014-252691

(51) Int. Cl.
G06F 3/041         (2006.01)
B60R 11/02         (2006.01)
(Continued)

(52) U.S. Cl.
CPC ............ G06F 3/0412 (2013.01); B60R 11/02 (2013.01); B60R 16/02 (2013.01); G06F 3/016 (2013.01);
(Continued)

(58) Field of Classification Search
CPC ........ G06F 3/0488; G06F 3/0346; G06F 3/01; G06F 3/0304
See application file for complete search history.

(56) References Cited

U.S. PATENT DOCUMENTS

2011/0122083 A1   5/2011  Takahashi et al.
2011/0234639 A1   9/2011  Shimotani et al.
(Continued)

FOREIGN PATENT DOCUMENTS

JP   2009-009261 A   1/2009
JP    201227875 A    2/2012
(Continued)

OTHER PUBLICATIONS

International Search Report issued for corresponding PCT/JP2015/079701 application.
(Continued)

*Primary Examiner* — Gerald Johnson
(74) *Attorney, Agent, or Firm* — IP Business Solutions, LLC

(57) ABSTRACT

To improve the detection accuracy of an operation for an object displayed on a display screen without corrupting display on the display screen.
A navigation device 100 includes: an acceleration sensor 130 which measures an acceleration; a display control unit 202 which displays an object for receiving an instruction of processing on a display panel of a display unit; an operation determination unit 204 which detects an operation for an object 165; and a setting unit 203 which sets a reaction region 167 detectable as an operation for the object 165 by the operation determination unit 204. The setting unit 203 changes the range of the reaction region 167 according to the magnitude and direction of the acceleration measured by the acceleration sensor 130.

5 Claims, 10 Drawing Sheets

(51) Int. Cl.
*B60R 16/02* (2006.01)
*G06F 3/01* (2006.01)
*G06F 3/0481* (2013.01)
*G06F 3/0488* (2013.01)
*G09G 5/00* (2006.01)
*G06F 3/0487* (2013.01)

(52) U.S. Cl.
CPC .......... *G06F 3/0416* (2013.01); *G06F 3/0418* (2013.01); *G06F 3/0487* (2013.01); *G06F 3/04817* (2013.01); *G06F 3/04886* (2013.01); *G09G 5/006* (2013.01); *G06F 2200/1637* (2013.01)

(56) References Cited

U.S. PATENT DOCUMENTS

| | | |
|---|---|---|
| 2012/0026110 A1 | 2/2012 | Yamano |
| 2012/0036468 A1 | 2/2012 | Colley |
| 2012/0231853 A1 | 9/2012 | Takahashi et al. |
| 2013/0241895 A1 | 9/2013 | Voss et al. |
| 2013/0314356 A1 | 11/2013 | Miyake |
| 2014/0035827 A1 | 2/2014 | Hyde et al. |
| 2015/0177826 A1* | 6/2015 | Aizawa ............ G06F 3/01 345/173 |

FOREIGN PATENT DOCUMENTS

| | | |
|---|---|---|
| JP | 2012-68706 A | 4/2012 |
| JP | 2012118652 A | 6/2012 |
| WO | 2010008078 A | 1/2010 |
| WO | 2010/064423 A1 | 6/2010 |
| WO | 2011055816 A1 | 5/2011 |
| WO | 2012/102055 A1 | 1/2012 |

OTHER PUBLICATIONS

Written Opinion of the International Search Authority issued for corresponding PCT/JP2015/079701 application.
International Preliminary Report on Patentability issued for corresponding PCT/JP2015/079701.
Written Opinion of the International Searching Authority issued for corresponding PCT/JP2015/079701.
Extended European Search Report mailed by the European Patent Office dated May 29, 2018 in the corresponding European patent application No. 15869651.8-1231.
Notice of Reasons for Refusal mailed by the Japan Patent Office dated Oct. 2, 2018 corresponding to Japanese Patent Application No. 2014-252691.

* cited by examiner

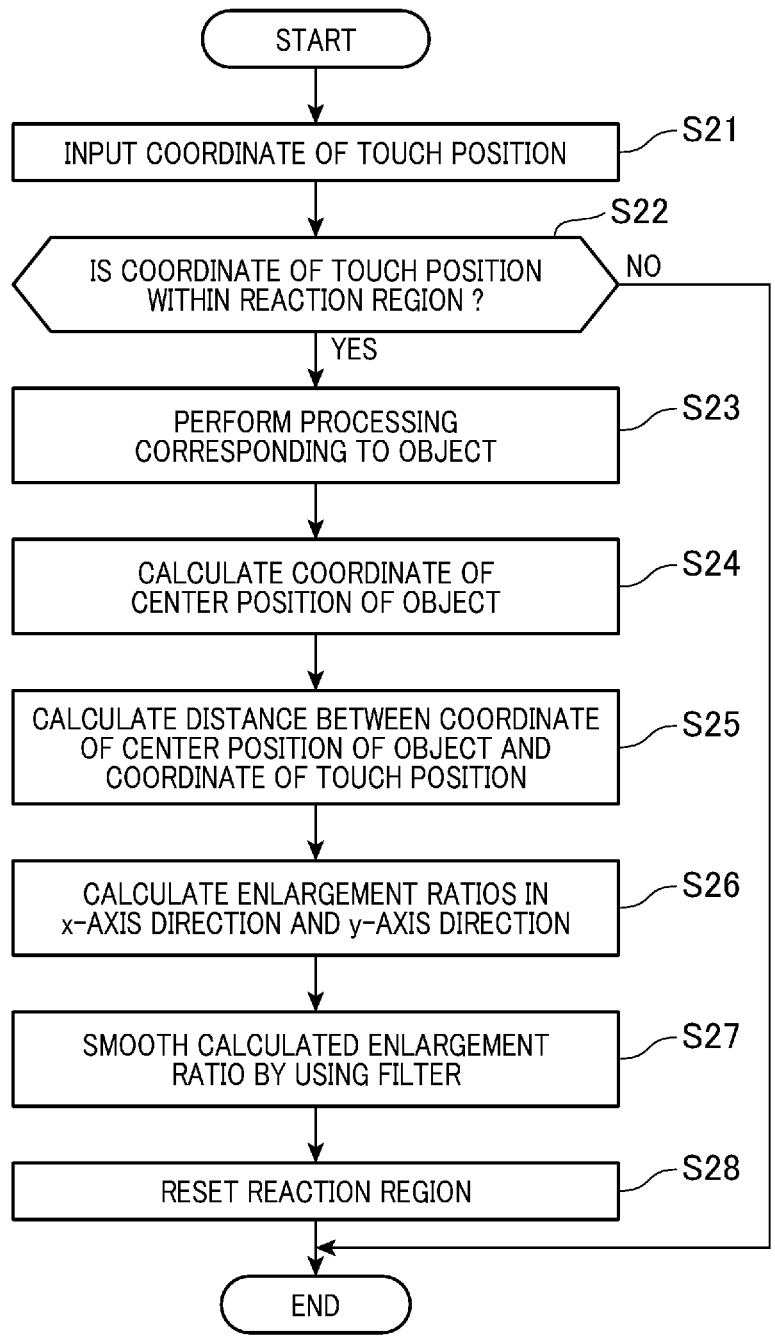

INFORMATION PROCESSING APPARATUS AND CONTROL METHOD OF INFORMATION PROCESSING APPARATUS

TECHNICAL FIELD

This present invention relates to an information processing apparatus and a control method of the information processing apparatus.

BACKGROUND ART

There have been known information processing apparatuses in which a touch panel is provided in a display unit (for example, see Patent Literature 1). Patent Literature 1 discloses a display input apparatus which enlarges an image such as a touch key or an icon displayed in a display region of the touch panel at an enlargement ratio corresponding to a vibration amount detected by vibration detection means.

CITATION LIST

Patent Literature

[Patent Literature 1]
International Publication No. WO 2010/064423

SUMMARY OF INVENTION

Technical Problem

However, in Patent Literature 1, since an image such as a touch key or an icon is enlarged at an enlargement ratio corresponding to a vibration amount, the enlarged image overlaps with the other image which is not enlarged. As a result, the other image may be hidden, and a screen layout may be corrupted.

The present invention has been made in view of the above problems, and an object of the present invention is to provide an information processing apparatus which improves detection accuracy of an operation for an object displayed on a display screen without corrupting display on the display screen, and a control method of the information processing apparatus.

Solution to Problem

All contents of Japanese Patent Application No. 2014-252691 filed on Dec. 15, 2014 are included in this specification.

To achieve the above-described object, the information processing apparatus according to the present invention includes: a measurement unit which measures an acceleration; a display control unit which displays an object for receiving an instruction of processing on a display screen; a detection unit which detects an operation for the object; and a setting unit which sets a reaction region on the display screen detectable as an operation for the object by the detection unit. The setting unit changes the range of the reaction region according to the magnitude and direction of the acceleration measured by the measurement unit.

According to such a configuration, the detection accuracy of an operation for the object displayed on the display unit can be improved without corrupting display on the display screen.

In the above-described information processing apparatus according to the present invention, the setting unit sets the reaction region to be larger than a display range of the object.

In such a configuration, even when any operation for the object is performed outside the display range region of the object, the operation can be detected as an operation for the object.

In the above-described information processing apparatus according to the present invention, the setting unit enlarges the reaction region in a direction opposite to an acceleration direction detected by the measurement unit to have a size proportional to the acceleration.

According to such a configuration, an operation for the object can be detected more reliably. For example, when the information processing apparatus is mounted on a vehicle and the acceleration is generated in the information processing apparatus and a user of the information processing apparatus, the user tries to hold the posture against the acceleration, and the user's operation for the object may be shifted to the side opposite to the acceleration direction. Thus the operation for the object can be detected more reliably by enlarging the reaction region in the direction opposite to the acceleration direction to have a size proportional to the acceleration.

In the above-described information processing apparatus according to the present invention, the setting unit resets the range of the reaction region according to the display position on the display screen touched by the user as an operation for the object.

Such a configuration enables to reduce the number of operation errors and improve the detection accuracy of the operation for the object.

In the above-described information processing apparatus according to the present invention, when the setting unit sets the reaction region in the region between a first object and a second object adjacent to the first object in a first direction, the setting unit sets the reaction region of the first object on the second object side and the reaction region of the second object on the first object side according to the ratio between the acceleration generated in the first direction and the acceleration generated in a second direction opposite to the first direction.

Such a configuration enables to appropriately set the reaction regions of the first object and the second object adjacent to each other according to the ratio of the acceleration.

A control method of the information processing apparatus according to the present invention includes: a measurement step of measuring an acceleration, a display step of displaying an object for receiving an instruction of processing on a display screen; a detection step of detecting an operation for the object by a detection unit; and a setting step of setting a reaction region detectable as an operation for the object by the detection unit. The setting step changes the range of the reaction region according to the magnitude and direction of the acceleration measured by the measurement step.

Such a configuration enables to improve the detection accuracy of the operation for the object displayed on the display unit without corrupting display on the display screen.

Advantageous Effect of Invention

According to the present invention, the detection accuracy of an operation for the object displayed on the display screen can be improved without corrupting display on the display screen.

BRIEF DESCRIPTION OF DRAWINGS

FIG. 7 is a flowchart illustrating process procedures of a control unit in a second embodiment.

DESCRIPTION OF EMBODIMENTS

[First Embodiment]

Figure 1:
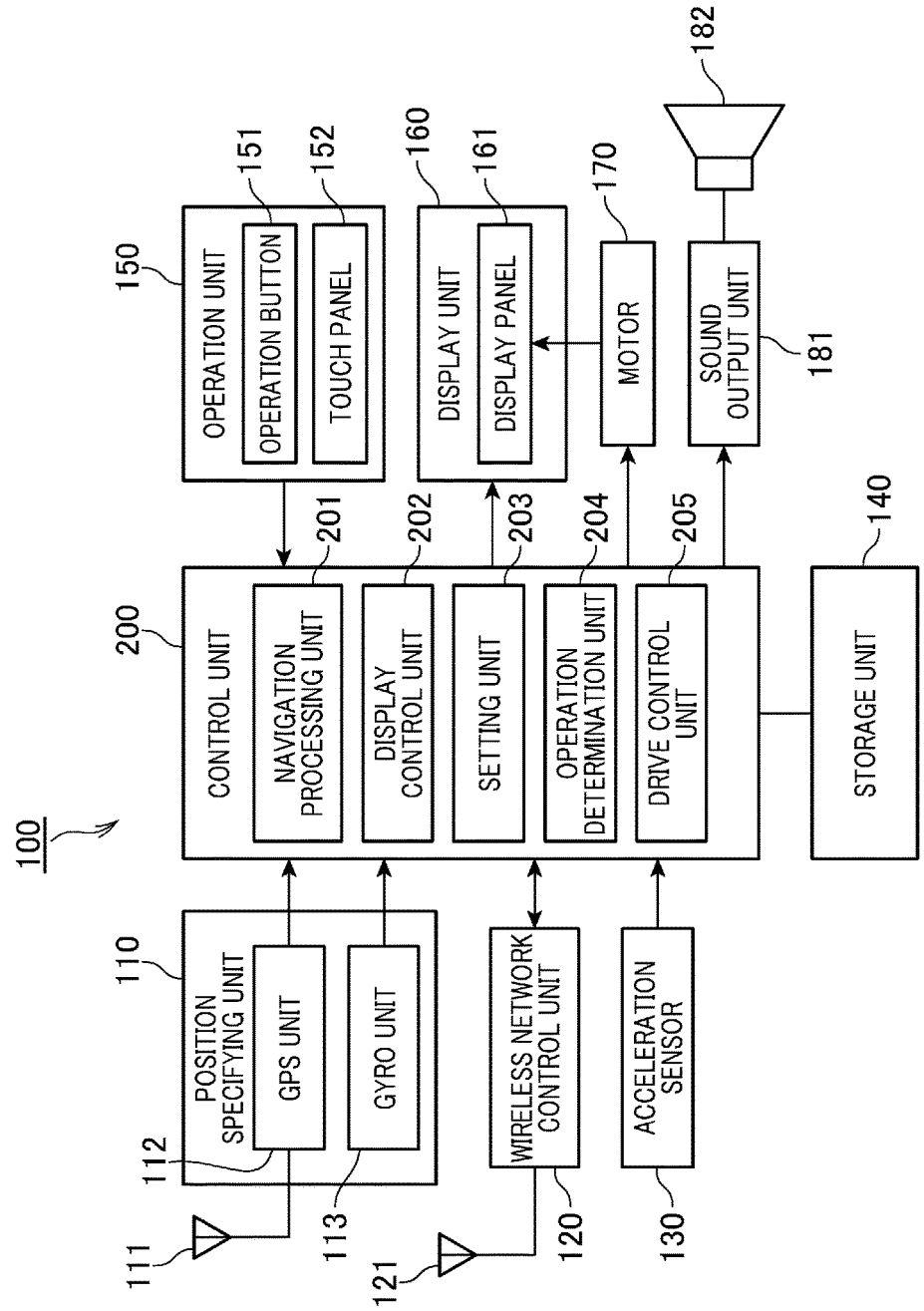
FIG. 1 is a block diagram illustrating a navigation device.

FIG. 1 is a block diagram illustrating a navigation device 100 serving as an information processing apparatus.

The navigation device 100 includes a position specifying unit 110, a wireless network control unit 120, an acceleration sensor 130, a storage unit 140, an operation unit 150, a display unit 160, a motor 170, a sound output unit 181, a speaker 182, and a control unit 200.

The position specifying unit 110 includes a GPS antenna 111, a GPS unit 112, and a gyro unit 113. The GPS unit 112 receives radio waves transmitted from a plurality of GPS satellites using the GPS antenna 111, and calculates position coordinates (latitude and longitude coordinates) indicating a current position and a traveling direction of a vehicle mounted with the navigation device 100 (hereinafter referred to as an "own vehicle") by performing a three-dimensional positioning process or a two-dimensional positioning process. The GPS unit 112 can also determine the current position using signals of positioning satellite systems such as GLONASS, Galileo, Beidou, and QZSS (Michibiki) instead of the GPS radio waves transmitted from the GPS satellites. The gyro unit 113 includes a fiber optic gyro, a vibration gyro, and the like, and detects an angular velocity based on rotational motions of the own vehicle.

The GPS unit 112 outputs information indicating the position coordinates and the traveling direction of the own vehicle to the control unit 200, and the gyro unit 113 outputs information indicating the angular velocity of the own vehicle.

The wireless network control unit 120 includes a wireless antenna 121. The wireless network control unit 120 is connected to a communication line network via the wireless antenna 121 to transmit and receive data to/from the other device such as a server which is connected to the communication line network.

The acceleration sensor 130 measures accelerations in three axis (X-axis, Y-axis, Z-axis) directions at a predetermined sampling frequency, and outputs signals indicating the measured accelerations in the three axis directions to the control unit 200. Various sensors such as a piezo-resistance type, an electrostatic capacitance type, and a heat detection type may be used for the acceleration sensor 130. Although illustrating an example of a configuration in which the acceleration sensor 130 is mounted in the navigation device 100, the present embodiment may be configured so that the navigation device 100 acquires three-axis accelerations measured by an acceleration sensor mounted in the own vehicle. Although the present embodiment illustrates an example where the three-axis acceleration sensor is used as the acceleration sensor 130, a one-axis acceleration sensor or a two-axis acceleration sensor may be used.

The storage unit 140 includes a storage medium such as a CD, a DVD, a hard disk, and a flash memory. The storage unit 140 stores a map database used for performing navigation functions and navigation data such as voice data for route guidance, in addition to control programs and application programs used for control by the control unit 200.

The operation unit 150 includes an operation button 151 and a touch panel 152 arranged on a display panel 161 of the display unit 160. When an icon or the like displayed on the display panel 161 is touched by a user's finger or by pressing a button, the coordinate information indicating a position touched on the touch panel 152 is input to the control unit 200. A detection system of the touch position on the touch panel 152 may be any of a resistance film system and an electrostatic capacitance system. Note that an operation similar to the operation of the operation unit 150 may be performed by a steering controller provided in a steering wheel.

The sound output unit 181 includes a D/A converter, an amplifier (both not illustrated), and the like. The sound output unit 181 digital/analog converts the voice data for route guidance to amplify by the amplifier, and outputs voice messages into a passenger compartment of the own vehicle.

As the display panel 161, a liquid crystal display panel, an EL (Electro Luminescent) display panel, and the like can be used, for example. The display unit 160 includes a drawing processor which inputs data such as map data and an instruction command instructing drawing from the control unit 200, and generates drawing data to be displayed on the display panel 161 (e.g., bit map image data) according to the input drawing command, a VRAM (Video RAM) which holds the generated drawing data, a drive circuit which displays an image based on the drawing data on the display panel 161, and the like.

The control unit 200 is constituted by a microprocessor mainly including a CPU. The control unit 200 includes, in addition to the CPU, a ROM which stores various processing programs, a RAM which serves as a working memory, an NVRAM which holds data, and an input/output port which inputs and outputs the data.

The control unit 200 includes a navigation processing unit 201, a display control unit 202, a setting unit 203, an operation determination unit 204, and a drive control unit 205 as function blocks. The function blocks are blocks into which functions achieved by cooperation of hardware included in the navigation device 100 and programs such as control programs and application programs are divided for each predetermined function.

The navigation processing unit 201 determines a current position of the own vehicle based on the information input from the GPS unit 112 and the gyro unit 113. The navigation processing unit 201 reads out map data of an area required for display from the map database based on the determined own vehicle position. The navigation processing unit 201 instructs the display control unit 202 to display a current position mark corresponding to the acquired current position overlapped with the read-out map data. The navigation processing unit 201, when a destination is set, searches for a traveling route from the current position to the destination. Then, the navigation processing unit 201 instructs the display control unit 202 to display the searched traveling route overlapped with the read-out map data.

The display control unit 202 controls the display on the display panel 161. When receiving the instructions from the navigation processing unit 201, the map data, and the data including the mark indicating the current position, the traveling route, and the like, the display control unit 202 generates the drawing commands according to the received instructions to output them together with the map data and the data including the mark indicating the current position, the traveling route, and the like to the display unit 160.

The display control unit 202 outputs data of a menu screen indicating a list of functions capable of being provided by the navigation device 100, and data of a screen displayed on the display panel 161 during execution of the function together with the drawing commands to the display unit 160.

Figure 2:
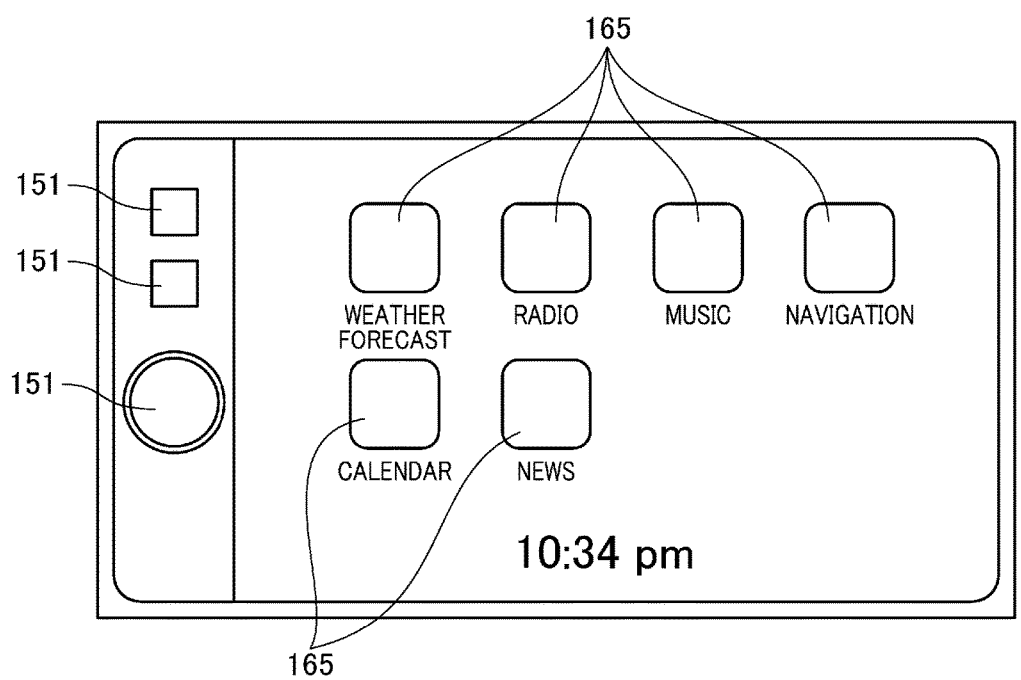
FIG. 2 is a diagram illustrating a menu screen.

FIG. 2 illustrates an example of a menu screen. A plurality of objects 165 which indicate functions such as radio, navigation, and weather forecast capable of being provided by the navigation device 100 are displayed on the menu screen. The object 165 is an object capable of accepting user's operation (instruction of processing) among images displayed on the display panel 161, and an image having a button function or an icon function, and a hyperlink or the like are included in the objects for example.

Figure 3A:
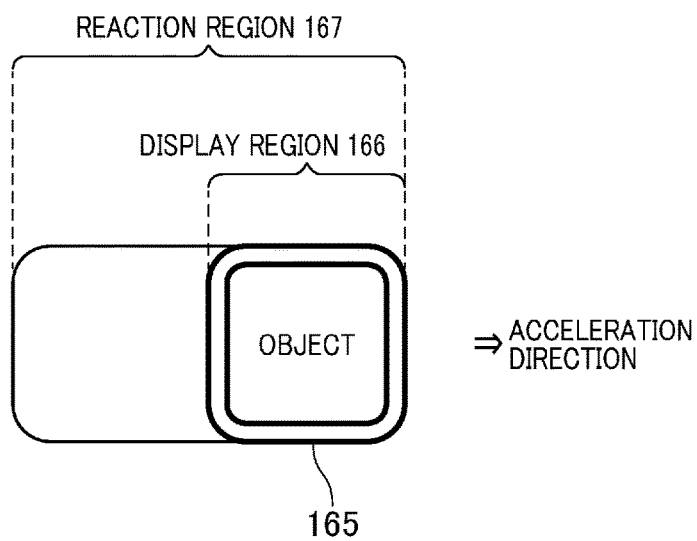
FIG. 3A is a diagram illustrating a reaction region set for an object when an acceleration is generated in a certain direction.

The setting unit 203 sets a reaction region 167 for the object 165 displayed on the display panel 161 by the display control unit 202. The operation determination unit 204 detects an operation for each object 165 based on a detected coordinate of a touch position on the touch panel 152. FIG. 3A is a diagram illustrating the reaction region 167 set for the object 165 when an acceleration is generated in a certain direction. A region indicated by oblique lines in FIG. 3A illustrates the reaction region 167. Although the reaction region 167 is not displayed on the display panel 161, when the user touches in the reaction region 167, the operation determination unit 204 determines it as the operation for the object 165.

When the acceleration is generated in the own vehicle mounted with the navigation device 100, the user intends to touch the image of the object 165 displayed on the display panel, but the user may touch outside the object 165 under the influence of the acceleration. To reduce such touch errors, the setting unit 203 sets the reaction region 167 to be larger than a display region 166 of the object 165 when the acceleration is generated in the navigation device 100.

FIG. 3A illustrates the reaction region 167 set by the setting unit 203 when the acceleration is generated in a right-hand direction as viewed from the front of FIG. 3A. The setting unit 203 sets the reaction region 167 so as to include the display region 166 of the object 165 and a left-side region of the display region 166 of the object 165.

When the acceleration is generated in the right-hand direction, the setting unit 203 enlarges the size of the reaction region 167 toward the left side of the object 165 according to the acceleration, the left side of the object 165 being the opposite side to the direction in which the acceleration is generated.

The operation determination unit 204 determines whether the coordinate on the touch panel 152 is detected as the operation for the object 165 based on the coordinate information input from the touch panel 152. For example, when the coordinate of the touch position is out of the display region 166 of the object 165, but is within the reaction region 167 for the object 165, the operation determination unit 204 determines it as the operation for the object 165.

Figure 4:
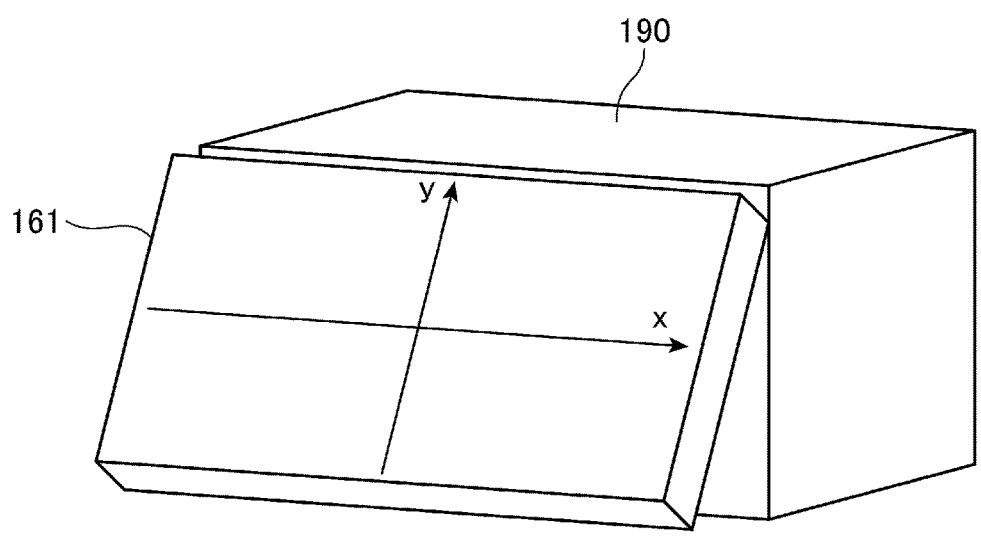
FIG. 4 is a diagram illustrating a state where a display panel is tilted with respect to a main body of a navigation device.

The drive control unit 205 controls drive of a motor 170 to tilt (incline) the display panel 161 with respect to a main body 190 of the navigation device 100. FIG. 4 is a diagram illustrating a state where the display panel 161 is tilted with respect to the main body 190 of the navigation device 100. When the motor 170 is driven and rotated, the drive control unit 205 stores the information about the rotation speed and the rotating direction of the rotating motor 170 in the RAM (not illustrated). The motor 170 rotates in normal and reverse directions. When the motor 170 rotates in the normal direction, the display panel 161 is tilted with respect to the main body 190 of the navigation device 100. When the motor 170 rotates in the reverse direction, the display panel 161 in the tilted state can be stored in the main body 190 of the navigation device 100.

Figure 5:
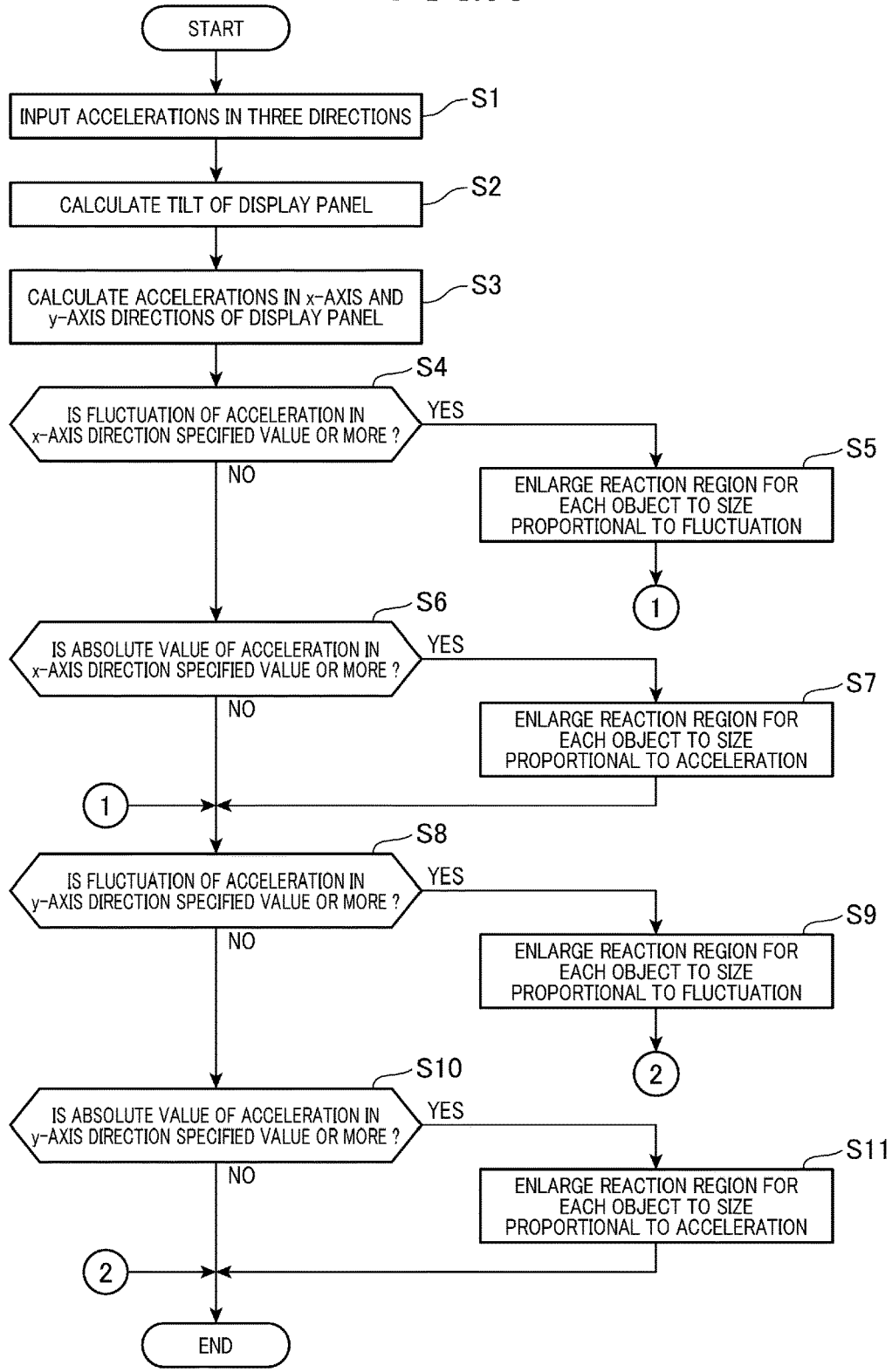
FIG. 5 is a flowchart illustrating process procedures of a control unit in a first embodiment.

FIG. 5 is a flowchart illustrating process procedures of the control unit 200 in the first embodiment.

The setting unit 203 inputs the accelerations in the three-axis (X-axis, Y-axis, Z-axis) directions measured by the acceleration sensor 130 (step S1). The acceleration sensor 130 measures the accelerations in the X-axis, Y-axis and Z-axis directions which are generated in the navigation device 100 at a preset sampling frequency, and outputs the measured accelerations to the control unit 200. The setting unit 203 stores the accelerations input from the acceleration sensor 130 in the RAM (not illustrated).

The setting unit 203 acquires the rotation speed and the rotating direction of the motor 170 from the drive control unit 205, and calculates the tilt of the display panel 161 based on the information about the acquired rotation speed and rotating direction (step S2). The NVRAM (not illustrated) stores the information about the tilting angle of the display panel 161 which can be tilted per one rotation of the motor 170. The setting unit 203 calculates the tilt of the display panel 161 with reference to the information about the tilting angle.

The setting unit 203 calculates the accelerations in the x-axis direction and the y-axis direction of the display panel 161 based on the acceleration in the X-axis, the Y-axis, and Z-axis directions stored in the RAM (step S3). The x-axis direction of the display panel 161 corresponds to a horizontal direction of the display panel 161 as illustrated in FIG. 4, and corresponds to the X-axis direction (left-right axis direction) measured by the acceleration sensor 130. Thus, the setting unit 203 uses the acceleration in the X-axis direction as the acceleration in the x-axis direction of the display panel 161. The setting unit 203 stores the acceleration in the x-axis direction of the display panel 161 in the RAM.

When the tilting angle of the display panel 161 is θ, the y-axis direction of the display panel 161 corresponds to a direction which is tilted by the tilting angle θ from the Z-axis which indicates a vertical direction. Thus, the setting unit 203 calculates the acceleration in the y-axis direction of the display panel 161 by integrating the acceleration in the Z-axis direction measured by the acceleration sensor 130 and a value of Cos θ. The setting unit 203 stores the acceleration in the y-axis direction of the display panel 161 in the RAM.

Note that the above-described processes of steps S1 to S3 are repeated, and the setting unit 203 calculates the accelerations in the x-axis and y-axis directions of the display panel 161 to store in the RAM each time the accelerations in the three-axis directions measured by the acceleration sensor 130 are input.

The setting unit 203 determines whether the fluctuation of the acceleration in the x-axis direction is a preset specified value or more (step S4). In step S4, it is determined whether a vibration in the x-axis direction is generated in the navigation device 100. The setting unit 203 determines whether the fluctuation of the acceleration in the x-axis direction is the preset specified value or more with reference to the acceleration in the x-axis direction for a predetermined time which is stored in the RAM. For example, the setting unit 203 retrieves the maximum acceleration value in a positive direction (e.g., right-hand direction as viewed from the front of FIG. 4), and the maximum acceleration value in a negative direction (e.g., left-hand direction as viewed from the front of FIG. 4). The setting unit 203 adds an absolute value of the retrieved acceleration in the positive direction and an absolute value of the retrieved acceleration in the negative direction. Then, the setting unit 203 compares the sum of the absolute values of the accelerations in the positive and negative directions with the preset specified value to determine whether the fluctuation of the acceleration in the x-axis direction is a preset specified value or more.

Figure 6A:
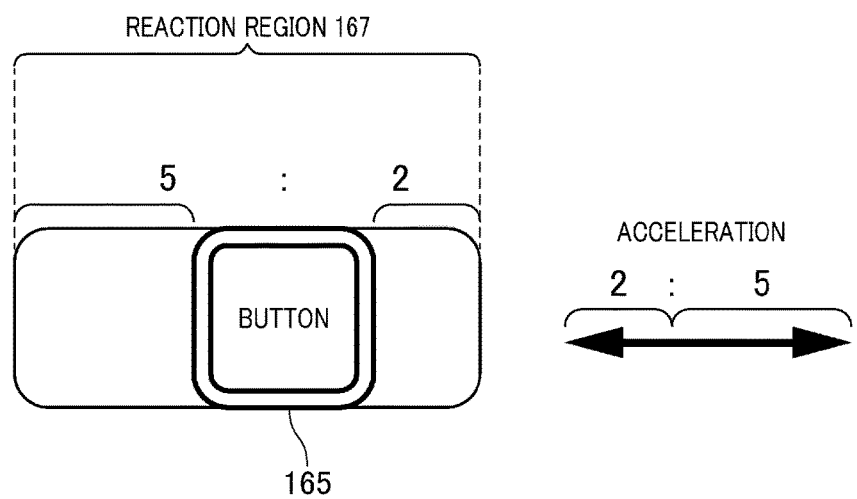
FIG. 6A is a diagram illustrating the reaction region set for the object when a vibration is generated.

If the result of the determination in step S4 is positive (step S4/YES), the setting unit 203 sets the reaction region 167 in the x-axis direction for each object 165 to enlarge to a size proportional to the fluctuation (step S5). FIG. 6A is a diagram illustrating the reaction region 167 set for the object 165 when the vibration is generated in the navigation device 100. The setting unit 203 calculates a ratio between the retrieved acceleration in the positive direction of the x-axis and the retrieved acceleration in the negative direction of the x-axis which are retrieved in step S4 to set the reaction region 167 for the object 165 based on the calculated ratio. For example, when the ratio between the acceleration in the left-hand direction which is the negative direction and the acceleration in the right-hand direction which is the positive direction is two to five, the setting unit 203 sets the ratio between the size of the reaction region 167 which is enlarged toward the left side of the object 165 and the size of the reaction region 167 which is enlarged toward the right side of the object 165 to five to two. The setting unit 203 enlarges the size of the reaction region 167 in the direction opposite to the direction in which the acceleration is generated, according to the acceleration. Thus, when the ratio between the acceleration in the left-hand direction and the acceleration in the right-hand direction is two to five, the setting unit 203 sets the ratio between the size of the reaction region 167 which is enlarged toward the left side of the object 165 and the size of the reaction region 167 which is enlarged toward the right side of the object 165 to five to two.

Figure 6B:
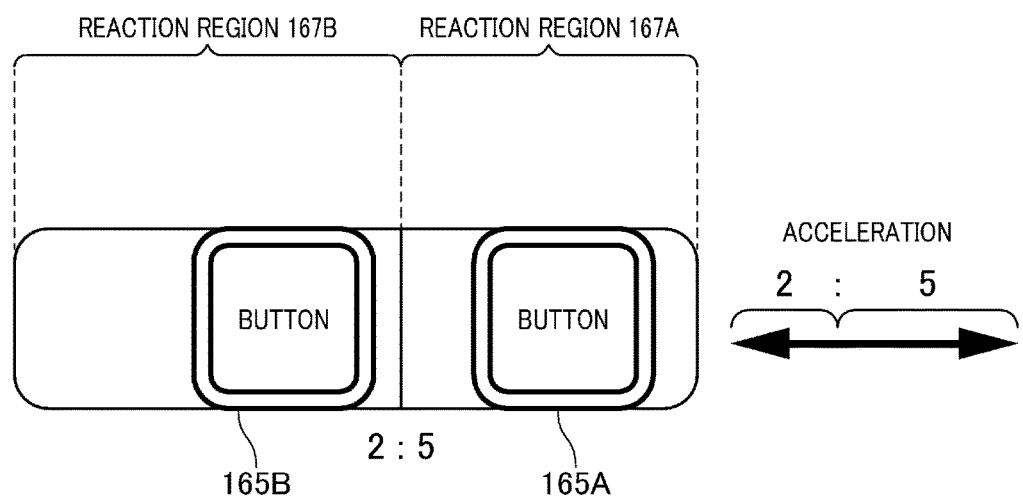
FIG. 6B is a diagram illustrating the reaction region set between two adjacent objects when the vibration is generated.

FIG. 6B is a diagram illustrating the reaction region 167 set between two adjacent objects 165 when the vibration is generated in the navigation device 100. Note that the object 165 on the right-hand side as viewed from the front of FIG. 6B is denoted as the object 165A (first object), and the object 165 on the left-hand side is denoted as the object 165B (second object). The reaction region 167 for the object 165A is denoted as the reaction region 167A, and the reaction region 167 of the object 165B is denoted as the reaction region 167B.

When the reaction regions 167A, 167B are set for the adjacent objects 165A, 165B, respectively, the setting unit 203 determines whether the reaction region 167A set on the left side of the object 165A overlaps with the reaction region 167B set on the right side of the object 165B.

When determining that the reaction region 167A overlaps with the reaction region 167B, the setting unit 203 sets the ratio of the reaction region 167A to the reaction region 167B in a range between adjacent objects 165A, 165B according to the ratio of the accelerations. For example, as illustrated in FIG. 6B, when the ratio between the acceleration in the left-hand direction as viewed from the front of FIG. 6B (acceleration generated in the first direction) and the acceleration in the right-hand direction (acceleration generated in the second direction) is two to five, the setting unit 203 sets the ratio between the size of the reaction region 167B which is enlarged toward the right side of the left-side object 165B and the size of the reaction region 167A which is enlarged toward the left side of the right-side object 165A to two to five.

If the result of the determination in step S4 is negative (step S4/NO), the setting unit 203 determines whether the absolute value of the acceleration in the x-axis direction is the preset specified value or more (step S6). In step S6, it is determined whether the acceleration in the positive or negative direction of a certain value or more is generated in the navigation device 100. The setting unit 203 selects the maximum acceleration value from the maximum absolute value of acceleration in the positive direction and the maximum absolute value of acceleration in the negative direction which are retrieved in step S4. The setting unit 203 compares the selected absolute value of the acceleration with the preset specified value to determine whether the selected absolute value of the acceleration is the specified value or more (step S6).

If the result of the determination in step S6 is positive (step S6/YES), the setting unit 203 enlarges the size of the reaction region 167 for each object 165 in the direction opposite to the direction in which the selected acceleration is generated according to the magnitude of the selected acceleration (step S7).

Figure 3B:
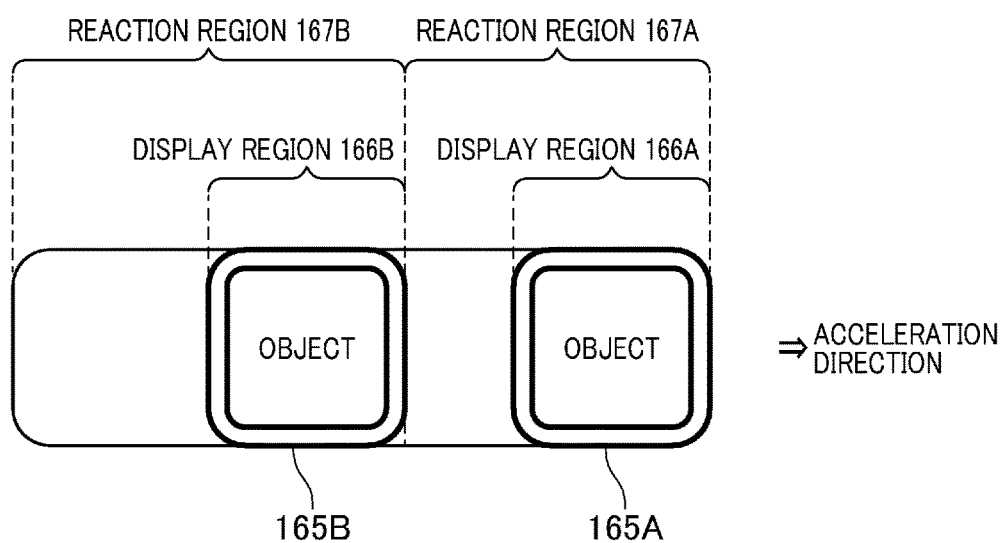
FIG. 3B is a diagram illustrating the reaction region set between two adjacent objects when the acceleration is generated in a certain direction.

FIG. 3B is a diagram illustrating the reaction region 167 set between two adjacent objects when the acceleration is generated in a certain direction. Note that FIG. 3B illustrates a state where the acceleration of a certain value or more is generated in the positive direction of the x-axis. In FIG. 3B, the right-side object 165 is denoted as the object 165A, and the left-side object 165 is denoted as the object 165B. The reaction region 167 for the object 165A is denoted as the reaction region 167A, and the reaction region 167 for the object 165B is denoted as the reaction region 167B.

When the acceleration is generated in a certain direction, the setting unit 203 enlarges the size of the reaction region 167 for one of objects 165 according to the acceleration to determine whether the enlarged reaction region 167 overlaps with the display region 166 for the other object 165.

When the setting unit 203 determines that the reaction region 167A for the object 165A overlaps with the display region 166 of the object 165B, the object 165B is prioritized in the display region 166 of the object 165B. That is, setting unit 203 does not enlarge the size of the reaction region 167A according to the acceleration, but enlarges the size of the reaction region 167A so that the reaction region 167A does not overlap with the display region 166 of the object 165B.

If the result of the determination in step S6 is negative (step S6/NO), or the processing in step S5 or step S7 is performed, the setting unit 203 determines whether the fluctuation of the acceleration in the y-axis direction is the preset specified value or more (step S8). In step S8, it is determined whether the vibration in the y-axis direction is generated in the navigation device 100. The setting unit 203 determines whether the fluctuation of the acceleration in the y-axis direction is the preset specified value or more with reference to the acceleration in the y-axis direction for a predetermined time which is stored in the RAM. Note that the processing in step S8 is similar to that in step S4, and thus the detailed description is omitted.

If the result of the determination in step S8 is positive (step S8/YES), the setting unit 203 sets the size of the reaction region 167 in the y-axis direction for the object 165 to enlarge to a size proportional to the fluctuation (step S9). The processing in step S9 is similar to that in step S5, and thus the detailed description is omitted.

If the result of the determination in step S8 is negative (step S8/NO), the setting unit 203 determines whether the absolute value of the acceleration in the y-axis direction is the preset specified value or more (step S10). In step S10, it is determined whether the acceleration of a certain value or more in the positive or negative direction of the y-axis direction is generated in the navigation device 100. The processing in step S10 is similar to that in step S6, and thus the detailed description is omitted.

If the result of the determination in step S10 is positive (step S10/YES), the setting unit 203 enlarges the size of the reaction region 167 for each object 165 in the direction opposite to the direction in which the selected acceleration is generated according to the magnitude of the selected acceleration (step S11). If the result of the determination in step S10 is negative (step S10/NO), the setting unit 203 ends this processing flow.

As described above in detail, the navigation device 100 of the present embodiment sets the size of the reaction region 167 capable of detecting an operation for the object according to the direction and magnitude of the acceleration which is generated in the navigation device 100. That is, the display of the object 165 such as an icon is not enlarged, but the size of the reaction region 167 capable of detecting an operation for the object 165 is enlarged, thereby reducing the number of operation errors for the object 165 without corrupting display on the display panel 161. When the vibration and the acceleration are generated in the own vehicle, the operation errors easily occur because the target position on the display panel 161 cannot be touched. However, the reaction region 167 is set to be larger than the display region 166 of the object 165, thereby enabling an operation for the object 165 to be detected even when the touch position is located outside the display region 166 of the object 165.

The navigation device 100 enlarges the size of the reaction region 167 in the direction opposite to the direction of the acceleration measured by the acceleration sensor 130, according to the acceleration. For example, when the acceleration is generated in the own vehicle, the user tries to hold the posture against the acceleration, and the user's operation for the object may be shifted to the side opposite to the direction in which the acceleration is generated. Therefore, in the present embodiment, the operation for the object 165 can be detected more reliably by enlarging the reaction region 167 in the direction opposite to the acceleration direction.

[Second Embodiment]

In the present embodiment, the size of the reaction region 167 set in the first embodiment is reset based on the touch position touched by the user. Specifically, in the present embodiment, when the user touches the display panel 161 after the reaction region 167 for the object 165 is set, the size of the reaction region 167 for the object 165 is reset based on a distance between the touched touch position and a center position of the object 165.

FIG. 7 is a flowchart illustrating process procedures of the control unit in the second embodiment.

The setting unit 203 inputs a coordinate of the touch position output from the touch panel 152 (step S21).

The operation determination unit 204 determines whether the input coordinate of the touch position is within the reaction region 167 for the object 165 when the coordinate of the touch position is input (step S22). If the result of the determination in step S22 is negative (step S22/NO), the operation determination unit 204 ends this processing flow. If the result of the determination in step S22 is positive (step 22/YES), the operation determination unit 204 instructs the other function block in the control unit 200 to perform the processing corresponding to the touched object 165 (step S23). For example, the control unit 200 controls the wireless network control unit 120 to start the processing such as connecting to the Internet, outputting music from the speaker 182, highlight-displaying the operation button 151, or the function of the navigation.

Figure 8A:
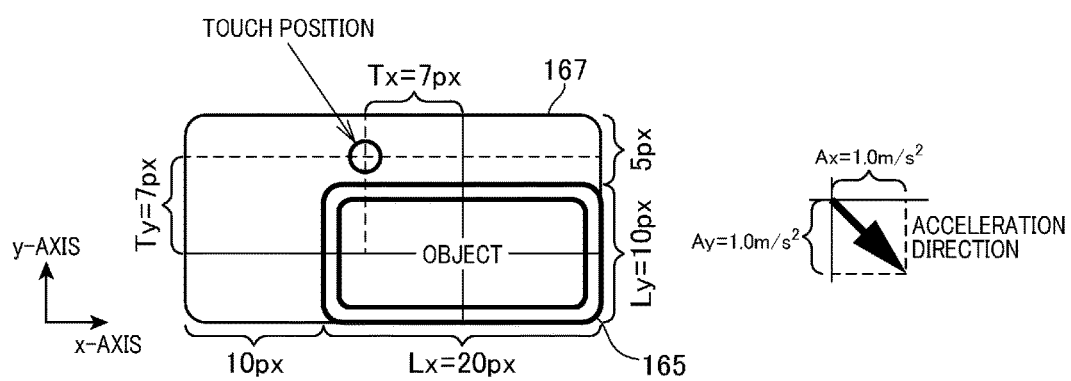
FIGS. 8A and 8B are diagrams for explaining a method of calculating an enlargement ratio α and an enlargement ratio β.
Figure 8B:
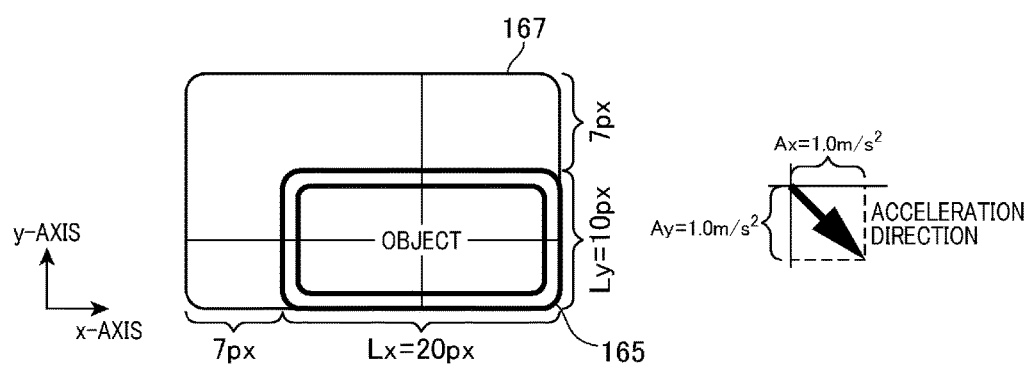

FIG. 8A is a diagram illustrating the object 165 and the reaction region 167 for the object 165 before changing an enlargement ratio. FIG. 8B is a diagram illustrating the object 165 and the reaction region 167 for the object 165 after changing the enlargement ratio.

The setting unit 203 acquires data representing the display region 166 of the touched object 165 from the display control unit 202, and calculates a coordinate of the center position of the object 165 based on the acquired data (step S24). The setting unit 203 calculates distances between the coordinate of the touch position and the coordinate of the center position of the object 165 in the x-axis direction and the y-axis direction of the display panel 161, respectively (step S25). A position enclosed by a circle in FIG. 8A indicates the position touched by the user. The setting unit 203 calculates the distance between the coordinate of the touch position and the coordinate of the center position of the object 165, and then converts the calculated distance into the number of pixels of the display panel 161. The number of x-axis pixels from the center of the object 165 to the touch position is denoted as Tx, and the number of y-axis pixels from the center of the object 165 to the touch position is denoted as Ty. The setting unit 203 calculates Tx and Ty, calculates the enlargement ratio α in the x-axis direction using the following expression (1), and calculates the enlargement ratio β in the y-axis direction using the following expression (2) (step S26).

$$\text{Enlargement ratio } \alpha = Tx/Lx/Ax \tag{1}$$

$$\text{Enlargement ratio } \beta = Ty/Ly/Ay \tag{2}$$

Note that the number of x-axis pixels of the object 165 displayed on the display panel 161 is denoted as Lx, and the number y-axis pixels of the object 165 is denoted as Ly. An x-axis component of the acceleration generated in the navigation device 100 is denoted as Ax, and a y-axis component of the acceleration is denoted as Ay.

For example, assume that the number of x-axis pixels Lx of the object 165 is 20 pixels, the number of y-axis pixels Ly is 10 pixels, the x-axis component Ax of the acceleration generated in the navigation device 100 is 1.0 m/s², the y-axis component Ay of the acceleration is 1.0 m/s². Assume that the number of x-axis pixels Tx from the center of the object 165 to the touch position is 7 pixels, and the number of y-axis pixels Ty from the center of the object 165 to the touch position is 5 pixels. In this case, when these numerical values are substituted into Expressions (1) and (2), the enlargement ratio α is "0.35," and the enlargement ratio β is "0.5."

The setting unit 203 smooths the calculated enlargement ratios α and β by using a low pass filter, or the like (step S27). The setting unit 203 may smooth the values of the enlargement ratios α and β by calculating a moving average other than using the low pass filter.

The setting unit 203 resets the size of the reaction region 167 using the smoothed enlargement ratios α and β (step S28). The setting unit 203 calculates the number of pixels increased in the x-axis direction by integrating the smoothed enlargement ratio α, the number of x-axis pixels Lx of the object 165, and the x-axis component of the acceleration. The setting unit 203 calculates the number of pixels increased in the y-axis direction by integrating the calculated enlargement ratio β, the number of y-axis pixels Ly of the object 165, and the y-axis component of the acceleration. Assuming that the enlargement ratio α is "0.35," the number of x-axis pixels Lx of the object 165 is 20 pixels, and the x-axis component Ax of the acceleration is 1.0 m/s², the number of x-axis pixels becomes 7 pixels. Assuming that the enlargement ratio β is "0.5," the number of y-axis pixels Ly of the object 165 is 10 pixels, and the y-axis component A of the acceleration is 1.0 m/s², the number of y-axis pixels becomes 7 pixels. FIG. 8B illustrates the reaction region 167 after resetting.

Figure 9:
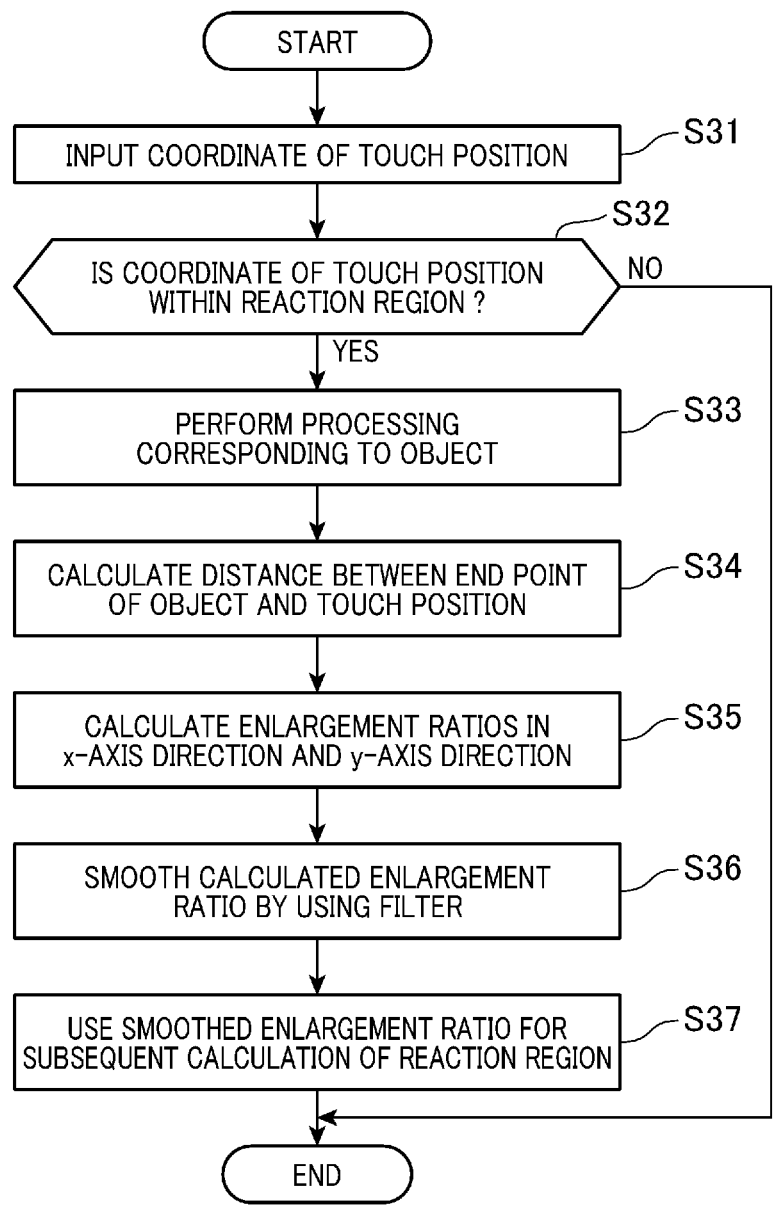
FIG. 9 is a flowchart illustrating another process procedures of the control unit in the second embodiment.
Figure 10A:
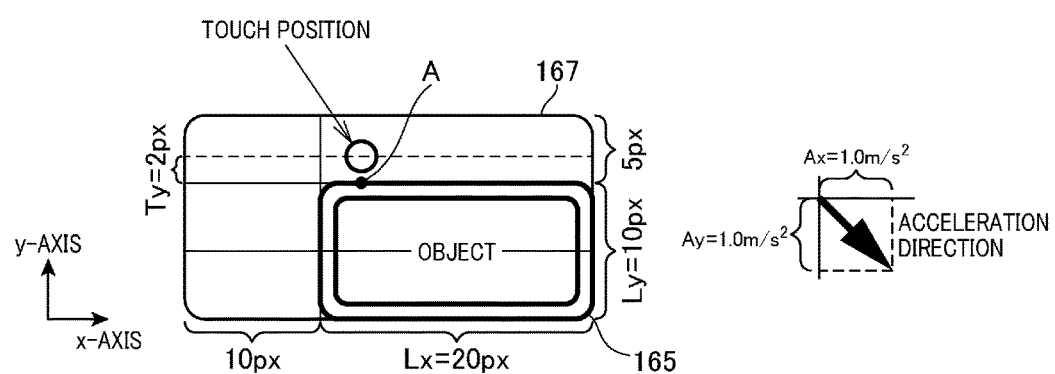
FIGS. 10A and 10B are diagrams for explaining another method of calculating an enlargement ratio α and an enlargement ratio β.
Figure 10B:
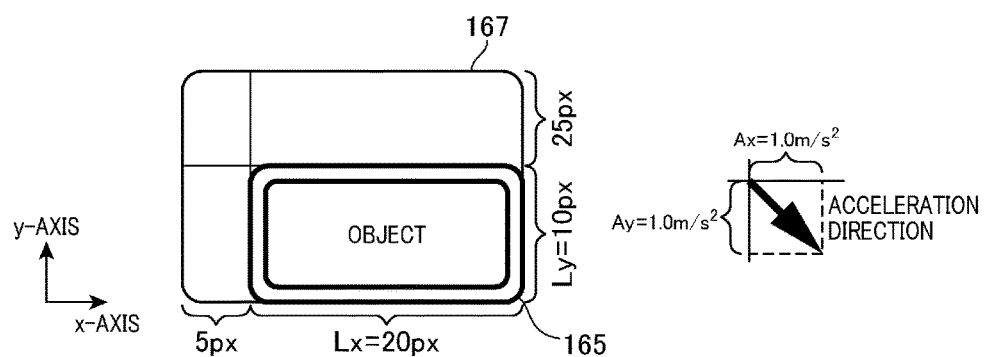

FIG. 9 is a flowchart illustrating the other process procedures of the control unit 200 in the second embodiment. FIGS. 10A and 10B are diagrams for describing the other methods of calculating the enlargement ratio α and the enlargement ratio β. In FIGS. 10A and 10B, the enlargement ratio α and the enlargement ratio β are calculated based on the distance between the touch position on the display panel 161 and an end point of the object 165 closest to the touch position. Note that the processing from step S31 to step S33 illustrated in FIG. 9 is the same as that from step S21 to step S23 illustrated in FIG. 7, and thus the detailed description is omitted.

The setting unit 203 calculates the distances between the coordinate of the touch position input from the touch panel 152 and the end point of the object 165 closest to the touch position in the x-axis direction and the y-axis direction of the display panel 161, respectively (step S34). In an example illustrated in FIG. 10A, the distance between the touch position and a point A is calculated. Note that since the touch position illustrated in FIG. 10A is within the display region 166 of the object 165 in the x-axis direction, the distance in the x-axis direction becomes "0."

The setting unit 203 calculates the distance, and converts the calculated distance into the number of pixels of the display panel 161. Assume that the number of x-axis pixels from the touch position to the endpoint of the object 165 closest to the touch position is denoted as Tx, and the number of y-axis pixels is denoted as Ty. The setting unit 203 calculates Tx and Ty, calculates the enlargement ratio α in the x-axis direction using the following expression (3), and calculates the enlargement ratio β in the y-axis direction using the following expression (4) (step S35).

$$\text{Enlargement ratio } \alpha = Tx + T/(Lx \times Ax) \tag{3}$$

$$\text{Enlargement ratio } \beta = Ty + T/(Ly \times Ay) \tag{4}$$

Note that the number of x-axis pixels of the object 165 displayed on the display panel 161 is denoted as Lx, and the number of y-axis pixels of the object 165 is denoted as Ly. An x-axis component of the acceleration generated in the navigation device 100 is denoted as Ax, and a y-axis component of the acceleration is denoted as Ay. A character "T" is a constant indicating what number of pixels can be increased at most to enlarge the reaction region 167 from the user's touch position. Note that to calculate the enlargement ratio α and the enlargement ratio β, the same value may be used for "T" and the different value may be used for "T."

For example, assume that the number of x-axis pixels Lx of the object 165 is 20 pixels, the number of y-axis pixels Ly is 10 pixels, the x-axis component Ax of the acceleration generated in the navigation device 100 is 1.0 m/s², the y-axis component Ay of the acceleration is 1.0 m/s². Assume that the number of x-axis pixels Tx from the touch position to the end point of the object 165 closest to the touch position is zero pixels, and the number of y-axis pixels Ty is 2 pixels. Assume that a value of "T" is 5. In this case, when these numerical values are substituted into Expressions (3) and (4), the enlargement ratio α is "0.25," and the enlargement ratio β is "2.5."

The setting unit 203 smooths the calculated enlargement ratios α and β by using a low pass filter, or the like (step S36). The setting unit 203 may smooth the values of the enlargement ratios α and β by calculating a moving average other than using the low pass filter.

The setting unit 203 resets the size of the reaction region 167 using the smoothed enlargement ratios α and β (step S37). The setting unit 203 calculates the number of pixels increased in the x-axis direction by integrating the smoothed enlargement ratio α, the number of x-axis pixels Lx of the object 165, and the x-axis component Ax of the acceleration. The setting unit 203 calculates the number of pixels increased in the y-axis direction by integrating the calculated enlargement ratio β, the number of y-axis pixels Ly of the object 165, and the y-axis component Ay of the acceleration. Assuming that the enlargement ratio α is "0.25," the number of x-axis pixels Lx of the object 165 is 20 pixels, and the x-axis component Ax of the acceleration is 1.0 m/s², the number of x-axis pixels becomes 5 pixels. Assuming that the enlargement ratio β is "2.5," the number of y-axis pixels Ly of the object 165 is 10 pixels, and the y-axis component Ay of the acceleration is 1.0 m/s², the number of y-axis pixels becomes 25 pixels. FIG. 10B illustrates the reaction region 167 after resetting the size.

As described above, in the present embodiment, the size of the reaction region 167 is reset in response to the touch position touched on the display panel 161 by the user, thereby reducing the number of operation errors for the object 165 and improving the detection accuracy of the operation for the object 165 displayed on the display unit 160.

In the methods of calculating the enlargement ratio α and the enlargement ratio β based on the distance between the touch position on the display panel 161 and the end point of the object 165 closest to the touch position as described with reference to FIGS. 10A and 10B, the enlargement ratio can be appropriately set when the shape of the object 165 is a lateral shape or a complicated shape which causes the user to tend to touch the object 165 aiming at the edge.

The above-described embodiments are preferable embodiments according to the present invention. However, the present invention is not limited to these embodiments, and various modifications can be made without departing from the scope of the present invention.

For example, in the above described embodiments, the navigation device 100 is explained as an example of an information processing apparatus, but the information processing apparatus is not limited to the navigation device 100. For example, the information processing apparatus may be an audio system provided with a touch panel which is mounted on a vehicle, a smartphone, a tablet terminal, or a notebook computer.

FIG. 1 illustrating the function blocks of the control unit 200 is a schematic diagram illustrating the functions of the navigation device 100 by classifying according to the main processing contents. A configuration of the navigation device 100 can be further divided into more blocks according to the processing contents. The function block may be configured to perform further more processing than one block illustrated in FIG. 1. The processing of each block may be performed by one piece of hardware or a plurality of pieces of hardware. The processing of each block may be realized by one program or a plurality of programs.

The control programs stored in the storage unit 140 may be downloaded to the storage unit 140 from the network through the wireless network control unit 120, loaded on the RAM, and performed by the CPU. The control programs may be directly loaded on the RAM from the network through the wireless network control unit 120, and performed by the CPU.

Note that the processing units of the flowcharts in FIGS. 5, 7 and 9 are divided according to the main processing contents to facilitate the processing of the setting unit 203 to understand. The present invention is not limited by how to divide the processing units and the names of the processing units. The processing of the setting unit 203 can be divided into further more processing units according to the processing contents, and can be divided so that one processing unit includes further more processing. If the similar setting unit 203 performs the division, the above-described processing order of the flowchart is not limited to the example illustrated.

REFERENCE SIGNS LIST

100 Navigation device
110 Position specifying unit
120 Wireless network control unit
130 Acceleration sensor
140 Storage unit
150 Operation unit
152 Touch panel
160 Display unit
161 Display panel
165 Object
166 Display region
167 Reaction region
170 Motor
200 Control unit
201 Navigation processing unit
202 Display control unit
203 Setting unit
204 Operation determination unit
205 Drive control unit

The invention claimed is:

1. An information processing apparatus comprising:
an acceleration sensor which measures an acceleration; and
a CPU connecting with the acceleration sensor,
wherein the CPU includes
a display control unit that displays an object for receiving an instruction of processing on a display screen,
a detection unit that detects an operation for the object, and
a setting unit that sets a reaction region on the display screen detectable as an operation for the object by the detection unit,
wherein the setting unit changes a range of the reaction region according to a magnitude and a direction of an acceleration measured by the acceleration sensor,
the setting unit calculates an enlargement ratio α in an x-axis direction of the display screen and an enlargement ratio β in a y-axis direction of the display screen based on a distance between a touch position, on the display screen, touched by a user as an operation for the object and an end point of the object closest to the touch position,
the x-axis direction corresponds to a horizontal direction of the display screen, when a tilting angle of the display screen is θ, the y-axis direction corresponds to a direction which is tilted by the tilting angle θ from a Z-axis which indicates a vertical direction, and
the setting unit resets the range of the reaction region using the enlargement ratio α and the enlargement ratio β.

2. The information processing apparatus according to claim 1, wherein
the setting unit sets the reaction region to be larger than a display range of the object.

3. The information processing apparatus according to claim 1, wherein
the setting unit enlarges the reaction region in a direction opposite to a direction of an acceleration detected by the acceleration sensor to have a size proportional to the acceleration.

4. The information processing apparatus according to claim 1, wherein
when the setting unit sets the reaction region in a region between a first object and a second object adjacent to the first object in a first direction, the setting unit sets the reaction region of the first object on the second object side and the reaction region of the second object on the first object side according to a ratio between the acceleration generated in the first direction and the acceleration generated in a second direction opposite to the first direction.

5. A control method of the information processing apparatus comprising:
a measurement step of measuring an acceleration by an acceleration sensor,
a display step of displaying an object for receiving an instruction of processing on a display screen by a display control unit of a CPU;
a detection step of detecting an operation for the object by a detection unit of the CPU; and
a setting step of setting a reaction region on the display screen detectable as an operation for the object by the detection unit of the CPU,
wherein the setting step changes a range of the reaction region according to a magnitude and a direction of an acceleration measured by the measurement step, the setting step calculates an enlargement ratio $\alpha$ in an x-axis direction of the display screen and an enlargement ratio $\beta$ in a y-axis direction of the display screen based on a distance between a touch position, on the display screen, touched by a user as an operation for the object and an end point of the object closest to the touch position, the x-axis direction corresponds to a horizontal direction of the display screen, when a tilting angle of the display screen is $\theta$, the y-axis direction corresponds to a direction which is tilted by the tilting angle $\theta$ from a Z-axis which indicates a vertical direction, and the setting step resets the range of the reaction region using the enlargement ratio $\alpha$ and the enlargement ratio $\beta$.

* * * * *